H. C. MASTERSON.
RAKE.
APPLICATION FILED JUNE 21, 1917.
1,252,134.
Patented Jan. 1, 1918.
2 SHEETS—SHEET 2.
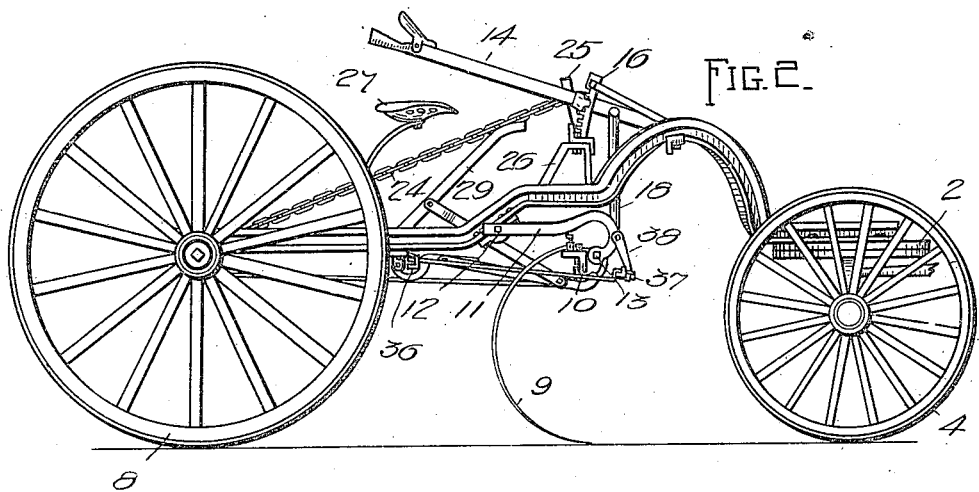
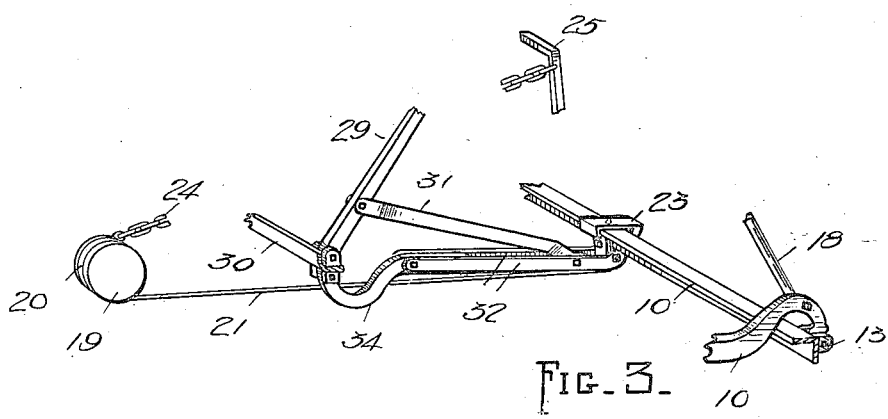
WITNESSES:
F. L. Barry
W. E. Beck
INVENTOR
Harry Charles Masterson
BY
ATTORNEYS

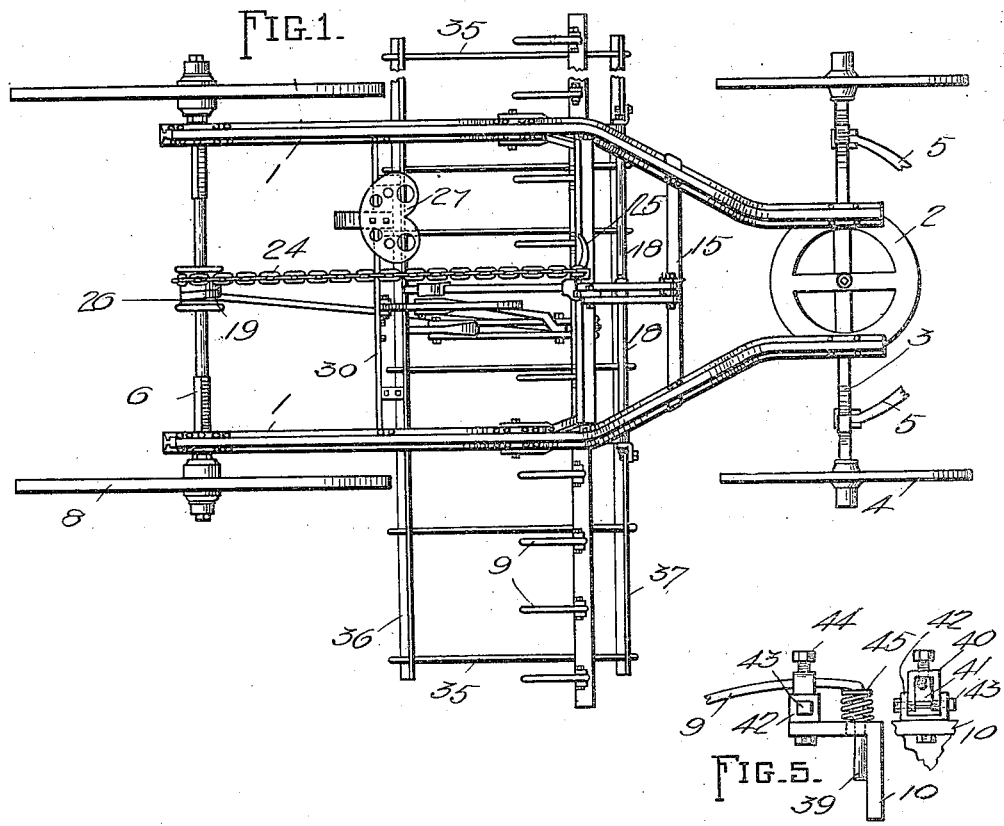
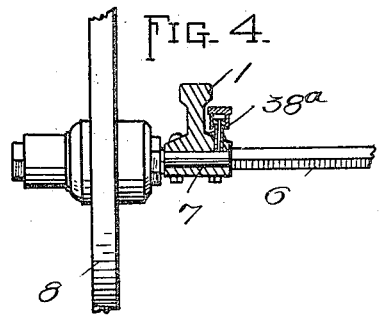
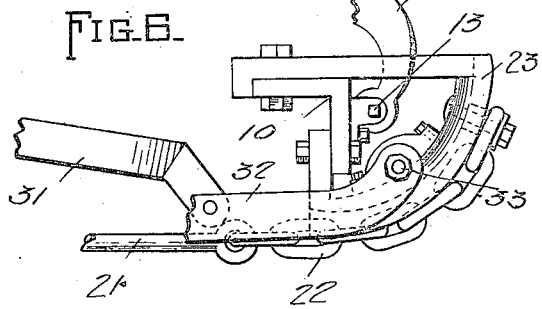

UNITED STATES PATENT OFFICE.

HARRY CHARLES MASTERSON, OF CLE ELUM, WASHINGTON.

RAKE.

1,252,134.

Specification of Letters Patent.

Patented Jan. 1, 1918.

Application filed June 21, 1917. Serial No. 176,130.

*To all whom it may concern:*

Be it known that I, HARRY C. MASTERSON, a citizen of the United States, and a resident of Cle Elum, in the county of Kittitas and State of Washington, have made certain new and useful Improvements in Rakes, of which the following is a specification.

My invention is an improvement in rakes, and has for its object to provide a rake of the character specified wherein the teeth are mounted to tilt to discharge the load, and means is provided in connection with the rear axle and controlled by the rotation for dumping the load of the rake when desired, the said means being normally released, and capable of being connected with the axle when desired.

In the accompanying drawings:—

Figure 1 is a top plan view of the improved rake.

Fig. 2 is a side view.

Fig. 3 is a partial perspective view of the dumping mechanism for the rake.

Fig. 4 is a sectional view of the rear axle.

Fig. 5 is a detail showing the manner of connecting the teeth, looking at the side and at the rear.

Fig. 6 is a detail of the connection between the rake and the dumping mechanism.

In the present embodiment of the invention a frame is provided consisting of longitudinally extending bars 1, connected at their front ends to the upper section of a fifth wheel 2, the lower section of the fifth wheel being connected with the front axle 3 upon which are journaled the usual wheels 4. A draft mechanism indicated at 5 is connected with the axle. A rear axle 6 is mounted at the rear of the frame, the axle being journaled in bearings 7 in the rear ends of the longitudinal bars 1, and wheels 8 are secured to the ends of the axle.

The teeth 9 of the rake are connected with an angle bar 10 extending transversely of the frame, which is supported by arms 11 pivoted to the frame as indicated at 12, and to the angle bar indicated at 13 at the front of the said bar. The bar 10 may be raised and lowered by means of a lever 14, which is pivoted to a cross bar 15 on the frame and has latch mechanism coöperating with the toothed sector 16 for holding the lever in adjusted position.

Links 18 connect the lever with the bar 10, the link being pivoted at one end to the lever and at the other to the arm 11, and it will be evident that by moving the lever in the proper direction, the bar 10 may be raised and lowered with respect to the frame swinging on the arms 11. These arms are curved at their front ends in order to allow of free movement of the bar 10. The rake may be dumped by hand or by power from the rear wheel. The latter mechanism comprises a drum 19 secured on the rear axle, and upon which winds a brake band 20.

This band has one end connected by a link 21 with a chain 22, which is secured to a quadrant 23, which is in turn secured to the bar 10. When the rake is in normal raking position, the chain fits upon the curved surface of the quadrant, and it will be obvious that when the link 21 is drawn rearwardly the bar 10 will be oscillated to lift the rake teeth to dump the rake.

A chain 24 connects the other end of the brake band with a treadle 25 pivoted to the bracket 26, which supports the sector 16, and this treadle is adapted to be operated by the operator seated in the seat 27.

The hand operating mechanism for dumping the rake consists of a lever 29, pivoted to a cross bar 30 on the frame, and the lever is connected by a link 31 with a pair of links 32, which are pivoted at their front ends to the quadrant, as indicated at 33. These links 32 at the rear ends are pivoted to opposite sides of an arm 34 pivotally connected to the underside of the cross bar 30 at its rear end.

It will be evident that when the upper end of the lever is swung upwardly the bar 10 will be tilted to lift the teeth, and means is provided for cleaning the teeth from the hay. The said means is a series of bars 35 supported at their ends by cross bars 36, 37 on the frame.

The bar 36 is supported by the arms 34 and the bar 37 is supported by links 38, which are pivoted at their upper ends to the arms 11 before mentioned, the arrangement being such that when the teeth are swung upward the front ends of the bars 35 will be swung downward to thoroughly clean the teeth from the accumulation of hay.

The brake band 20 is wrapped a complete turn about the drum, and it will be evident that when the band is tightened on the drum by moving the treadle forwardly, that portion of the band between the drum and the chain 22 will be drawn rearwardly and the rake teeth will be swung upwardly. At the same time the bars 35 will be swung downwardly and the load will be dumped.

The large rear wheels give ample power for dumping the heaviest load. The teeth may be adjusted by means of the lever 14. In Fig. 4 is shown mechanism for oiling the axle in the bearing 7. The said mechanism comprises oil cups 38ª arranged at the inner sides of the bars 1. In Fig. 5 the manner of connecting the teeth to the angle bar 10 is shown. Each tooth 9 is provided at its front end with an angular portion 39. Each tooth is passed through a sectional clamp consisting of sections 40 and 41. These sections are connected to each other and pivoted to a bracket 42 on the bar 10, by means of the bolt 43, and the teeth are passed between the sections of the bracket, with the portion 39 depending through an opening in the horizontal portion of the angle bar 10.

A set screw 44 is threaded through the section 40 of the clamp in engagement with the teeth and a coil spring 45 encircles the portion 39 between the angle bar and the teeth. The springs 45 keep the pointed ends of the teeth firmly on the ground.

I claim:

In a hay rake, the combination with the frame, the axle and the wheels secured to the axle, a rake mounted to swing on the frame, a drum on the axle, a brake band having its intermediate portion wound about the drum and connected at its front end to the rake to dump the same when the band is tightened on the drum, and manually operated means for tightening the band.

HARRY CHARLES MASTERSON.

Copies of this patent may be obtained for five cents each, by addressing the "Commissioner of Patents, Washington, D. C."